(12) United States Patent
Wucherpfennig et al.

(10) Patent No.: US 6,578,854 B2
(45) Date of Patent: Jun. 17, 2003

(54) PERSONAL MOBILITY VEHICLE INCORPORATING TILTING AND SWIVELING SEAT AND METHOD FOR USE WHILE PLAYING GOLF

(75) Inventors: Fredrick D. Wucherpfennig, Highlands Ranch, CO (US); David J. Boyer, Castle Rock, CO (US)

(73) Assignee: Solorider Industries, Inc., Denver, CO (US)

( * ) Notice: Subject to any disclaimer, the term of this patent is extended or adjusted under 35 U.S.C. 154(b) by 0 days.

(21) Appl. No.: 09/918,757

(22) Filed: Jul. 30, 2001

(65) Prior Publication Data

US 2003/0019684 A1 Jan. 30, 2003

(51) Int. Cl.⁷ .............................................. B60K 26/00
(52) U.S. Cl. .............................. 280/DIG. 5; 180/330; 180/65.1; 296/107.01; 296/65.01; 297/DIG. 10
(58) Field of Search .......................... 180/65.1, 327, 180/328, 330, DIG. 907; 280/DIG. 5, 304.1; 296/100.14, 111, 65.01, 107.01; 297/DIG. 4, DIG. 10

(56) References Cited

U.S. PATENT DOCUMENTS

| | | | |
|---|---|---|---|
| 4,019,602 A | * 4/1977 | Habiger | 180/273 |
| 4,042,055 A | 8/1977 | Ward | |
| 4,076,304 A | * 2/1978 | Deucher | 297/330 |
| 4,458,915 A | 7/1984 | Emery | |
| 4,480,867 A | * 11/1984 | Ezell et al. | 180/330 |
| 4,792,188 A | * 12/1988 | Kawashima | 248/418 |
| 4,846,524 A | * 7/1989 | Gerber | 135/88.09 |
| 4,873,964 A | 10/1989 | Bonoan | |
| 5,058,943 A | * 10/1991 | Louderback | 296/107.09 |
| 5,090,512 A | 2/1992 | Bussinger | |
| 5,224,750 A | 7/1993 | Clark et al. | |
| 5,312,126 A | 5/1994 | Shortt et al. | |
| 5,316,370 A | 5/1994 | Newman | |
| 5,333,931 A | 8/1994 | Weddendorf | |
| 5,341,894 A | * 8/1994 | Van Gorder et al. | 180/271 |
| 5,346,280 A | 9/1994 | Deumite | |
| 5,363,934 A | * 11/1994 | Edmund et al. | 180/6.5 |
| 5,482,354 A | * 1/1996 | Gryp | 297/344.22 |
| 5,513,867 A | * 5/1996 | Bloswick et al. | 280/250.1 |
| 5,672,116 A | 9/1997 | Bryan et al. | |
| 5,673,970 A | 10/1997 | Holmquist | |
| 5,690,185 A | * 11/1997 | Sengel | 180/65.1 |
| 5,727,642 A | * 3/1998 | Abbott | 180/6.5 |
| 5,732,788 A | * 3/1998 | Brown | 180/326 |
| 5,772,226 A | * 6/1998 | Bobichon | 180/907 |
| 5,803,545 A | 9/1998 | Guguin | |
| 5,950,751 A | * 9/1999 | McComber | 180/215 |
| 5,984,411 A | * 11/1999 | Galumbeck | 297/330 |
| 6,000,758 A | 12/1999 | Schaffner et al. | |
| 6,113,188 A | 9/2000 | Stewart et al. | |
| 6,125,957 A | 10/2000 | Kauffmann | |
| 6,152,478 A | 11/2000 | Hung | |
| 6,154,690 A | 11/2000 | Coleman | |
| 6,154,896 A | 12/2000 | Houston et al. | |
| 6,192,533 B1 | 2/2001 | Porcheron | |
| 6,220,647 B1 | * 4/2001 | Winkler | 135/88.01 |
| 6,231,067 B1 | 5/2001 | Johnson et al. | |
| 6,250,717 B1 | * 6/2001 | Porcheron | 297/411.3 |

FOREIGN PATENT DOCUMENTS

EP     0 600 198 A2     10/1993

* cited by examiner

*Primary Examiner*—Brian L. Johnson
*Assistant Examiner*—Kelly E Campbell
(74) *Attorney, Agent, or Firm*—Kurt Leyendecker; Leyendecker Law Offices

(57) ABSTRACT

A personal mobility vehicle for use by disabled persons to perform certain tasks such as playing golf is described. The mobility vehicle which in one embodiment comprises a golf cart includes a seat assembly that can be (i) swiveled to permit the rider to face sideways of rearwardly and (ii) tilted to move the rider into a pseudo-standing stance. Accordingly, the rider can address and hit a golf ball in a similar manner as a person who is not disable while being supported by the vehicle's seat. In the preferred embodiment, a canopy is provided that automatically retracts as the seat is tilted.

46 Claims, 12 Drawing Sheets

PERSONAL MOBILITY VEHICLE INCORPORATING TILTING AND SWIVELING SEAT AND METHOD FOR USE WHILE PLAYING GOLF

BACKGROUND OF THE INVENTION

1. Field of the Invention

The present invention relates to personal mobility vehicles primarily for use by disabled persons. More specifically, the present invention relates to a personal mobility vehicle incorporating a seat assembly capable of being swiveled in a substantially horizontal plane, as well as, being capable of being raised and tilted so as to put a rider into an at least partially elevated stance.

2. Description of the Prior Art

Personal mobility vehicles, such as wheelchairs and carts, are well known in the art for providing disabled persons with a means for transport. Various mechanisms and functionality have been incorporated into personal mobility vehicles to increase the ability of disabled persons to perform various tasks.

Wheelchair-type personal mobility vehicles are typically characterized by a relatively short wheel base and a narrow width, so that they can be used in interior spaces where they must fit through narrow doorways and negotiate in small spaces. Given these severe size constraints, powered wheelchairs typically have a limited range and a rather low top speed making them ill-suited to use outdoors when covering relatively long distances. Furthermore, because of their very short wheelbase, they are not well suited to travel over irregular surfaces such as lawns and dirt paths, which may include steep grades that would cause the wheelchair to become unstable.

Because they typically do duty as leg replacements for disabled persons, wheelchairs have been designed that attempt to minimize the limitations of a disabled person in his or her day to day activities. As mentioned above, one feature known to be incorporated into certain wheelchairs is a tilting and/or lifting seat as is described in U.S. Pat. Nos. 4,076,304; 5,346,280; 5,363,934; 5,772,226; 6,125,957; 6,192,533; and 6,231,067. The seats in each of these wheelchairs is described as elevating the user into a "standing" position. In all but U.S. Pat. No. 5,363,934, the seat bottom's front edge is tilted downwardly while the seat back is raised and maintained at a substantially vertical orientation. Three of the described chairs (U.S. Pat. Nos. 5,346,280; 4,076,304; and 6,192,533) require stabilizer legs that contact the ground when the user is in the "standing" position to prevent the wheelchair from inadvertently tipping over. In general the very narrow track of the described wheelchairs, with or without stabilization would not be acceptable for use in tasks involving substantial dynamic movement, such as swinging a golf club. Furthermore, given the short wheel base, these vehicles would be particularly unstable on sloped ground, especially when combined with the dynamic movement of the user.

None of the wheelchairs described in the aforementioned patents permit the seat to be swiveled. It is to be appreciated that because of the short wheel base and track width of wheelchairs that swiveling the seat and subsequently raising the seat into a "standing" position would almost assuredly make the wheelchair and user unstable and subject to tipping.

Cart-type personal mobility vehicles are on the other hand more suitable for providing mobility over irregular surfaces as they have longer wheelbases and track widths, providing for greater stability than wheelchairs. Furthermore, because of their increased sized they can utilize larger motors and larger battery packs which provide for a greater range of travel. Because carts are typically too large for indoor use, they are typically designed around specific outdoor uses. One use of cart-type personal mobility vehicles includes transporting disabled and other persons around a golf course, where the distances traveled and the uneven terrain make wheelchairs impractical. It is also to be appreciated that the relatively high pressure exerted by the wheelchair's points of contact with the ground makes it un-usable on a golf course due to the likelihood of either damaging the grounds or becoming stuck.

Since cart-type personal mobility vehicles typically include a steering wheel or steering tiller, several carts have been described in U.S. Pat. Nos. 5,341,894; 5,727,642; and 5,950,751 that swivel the rider to the side, wherein the rider can more easily perform activities that require him to be facing in the direction of the task being performed. It is of particular note that all of the carts described in the aforementioned patents relate to providing both a transport means and a platform from which a disabled person can participate in golf. It is to be appreciated that neither of the described carts permit the seat to be raised and tilted as to put the rider into a "standing" position.

SUMMARY OF THE INVENTION

A mobility vehicle for use by disabled persons is described. In one embodiment, the mobility vehicle comprises a chassis or framework coupled with a wheeled drive system. A seat assembly is pivotally attached to the chassis for swiveling movement about an axis of rotation. The seat assembly includes a seat bottom, a seat back and a tilt mechanism coupled to the seat back and bottom. The tilt mechanism is configured for moving the seat assembly between a first position wherein the seat bottom is generally horizontal and a second position, wherein the seat bottom is tilted to an angle relative to horizontal. In both tilt positions the seat back is maintained in a generally vertical orientation. In variations of this embodiment, a releasable restraining mechanism is provided to hold the seat in one or more swivel positions, and a canopy is provided for shading the rider that retracts as the seat assembly is moved into its second position. Preferably, the tilting of the seat assembly is accomplished by a linear actuator that is attached to the seat back at one end.

In another embodiment, the mobility vehicle comprises a seat assembly incorporating a linear actuator and a four bar linkage to facilitate the tilting of the seat bottom and movement of the seat back is described. The seat bottom is moveable from a fully retracted position wherein the seat bottom is generally horizontal to a fully tilted position wherein the seat bottom forms an angle with a horizontal plane. Actuation of the linear actuator acting through the seat back and four bar linkage causes the seat bottom to tilt, while the orientation of the seat back relative to horizontal is maintained at a relatively constant angle.

In another embodiment, the seat bottom of the seat assembly is pivotally attached to a swivel frame of the seat assembly at its front edge such that the seat bottom is tilted by raising a rear edge of the seat bottom about a horizontal axis defined by the pivotal connection. In variations of this embodiment the seat back is raised in unison with the rear edge of the seat bottom, while the angle of the seat back does not change significantly.

In yet another embodiment, a mobility vehicle is described that incorporates a seat assembly wherein the seat bottom of the seat assembly can be both swiveled about a vertical axis and tilted to angles in excess of 25 degrees. By tilting the seat bottom, a person seated thereon can be moved from a sitting position to a standing stance.

DESCRIPTION OF THE PREFERRED EMBODIMENTS

A personal mobility vehicle for a disabled person incorporating a seat assembly that both rotates about an axis and tilts upwardly to move the disabled person into a pseudo-standing position is described. In an exemplary embodiment, the mobility vehicle is a golf cart for use by a paraplegic. The cart provides storage for golf clubs, and a convenient means for traveling the golf course. To hit a golf ball the user can swivel the seat to the right, left or towards a rearwardly facing position that clears the sides of the vehicle so that the user may freely swing a golf club. Furthermore, the seat can be tilted forward and raised upwardly while the backrest is maintained in a generally vertical orientation to facilitate hitting a golf ball from the pseudo-standing position.

It is to be appreciated that although the present invention is described below in terms of a golf cart, the present invention can be utilized in a wide variety of personal mobility vehicles for a variety of uses as would be obvious to one of skill in the art with the benefit of this disclosure. For instance, a personal mobility vehicle incorporating the advantages of the present invention can be utilized by a disabled person as a means for transportation, wherein the swiveling and tilting functions, utilized alone or together, provide the user with an easier means of ingress or egress or the ability to reach things that would be unreachable in the driving position.

Figure 1:
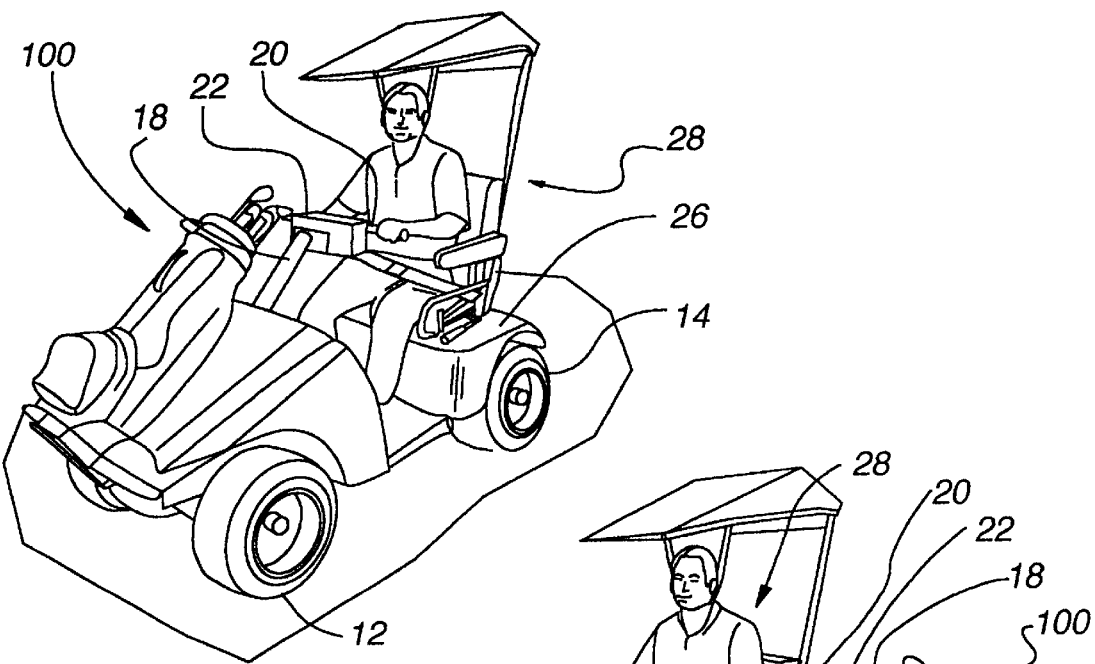
FIG. 1 is an isometric illustration of a personal mobility vehicle in the form of a golf cart according to one embodiment of the present invention.
Figure 2:
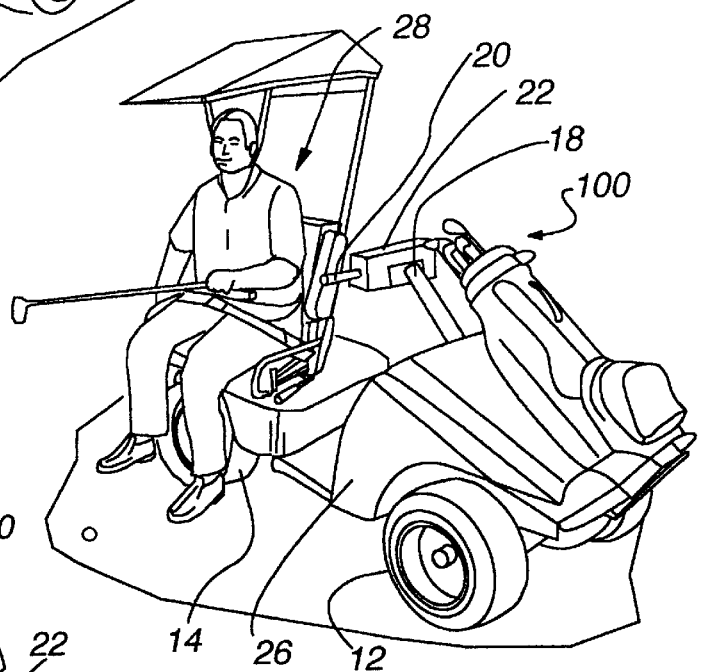
FIG. 2 is an isometric illustration of a golf cart similar to FIG. 1, wherein the seat assembly has been swiveled to one side of the cart.
Figure 3:
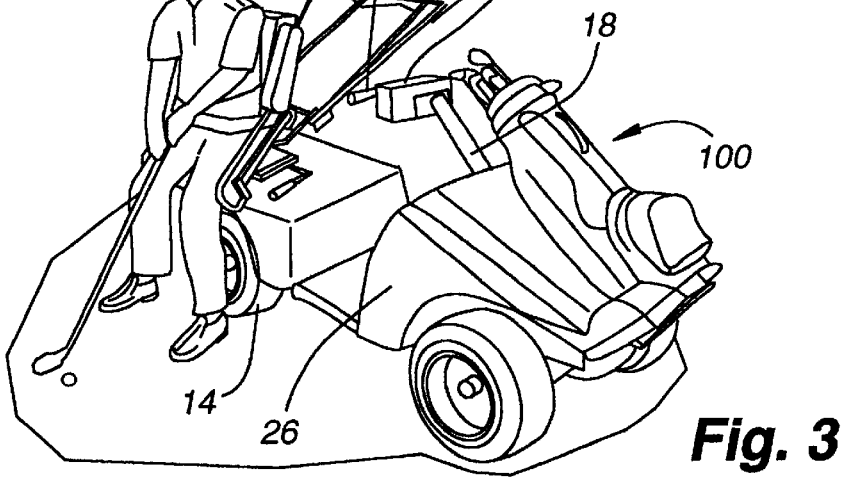
FIG. 3 is an isometric illustration of a golf cart similar to FIG. 2, wherein the seat has been tilted and raised to place the rider in a pseudo-standing position suitable for hitting a golf ball with a golf club.
Figure 4:
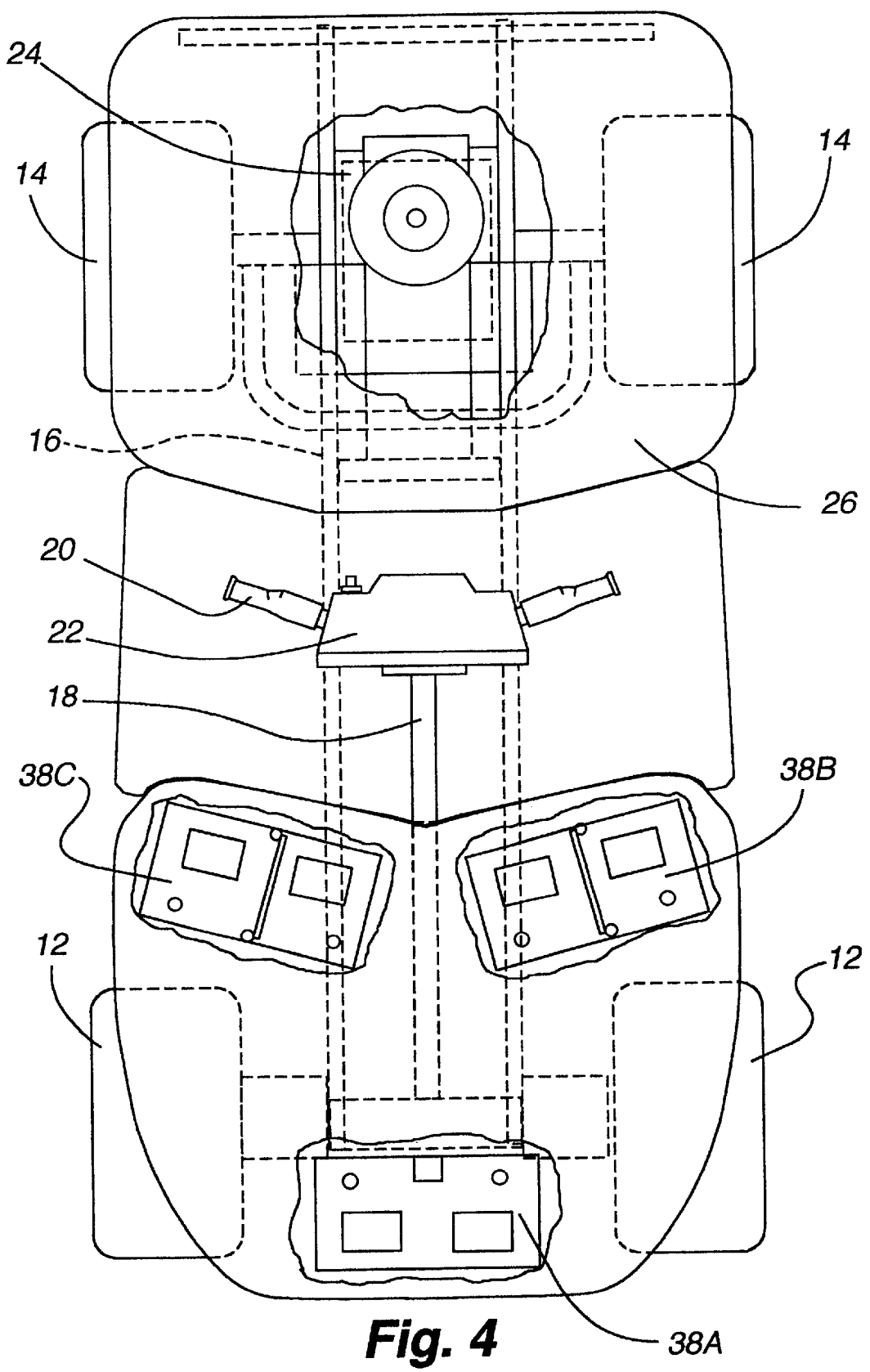
FIG. 4 Is a top view of a personal mobility vehicle with the seat assembly removed and cutouts provided to show the location of the batteries and the motor.
Figure 7:
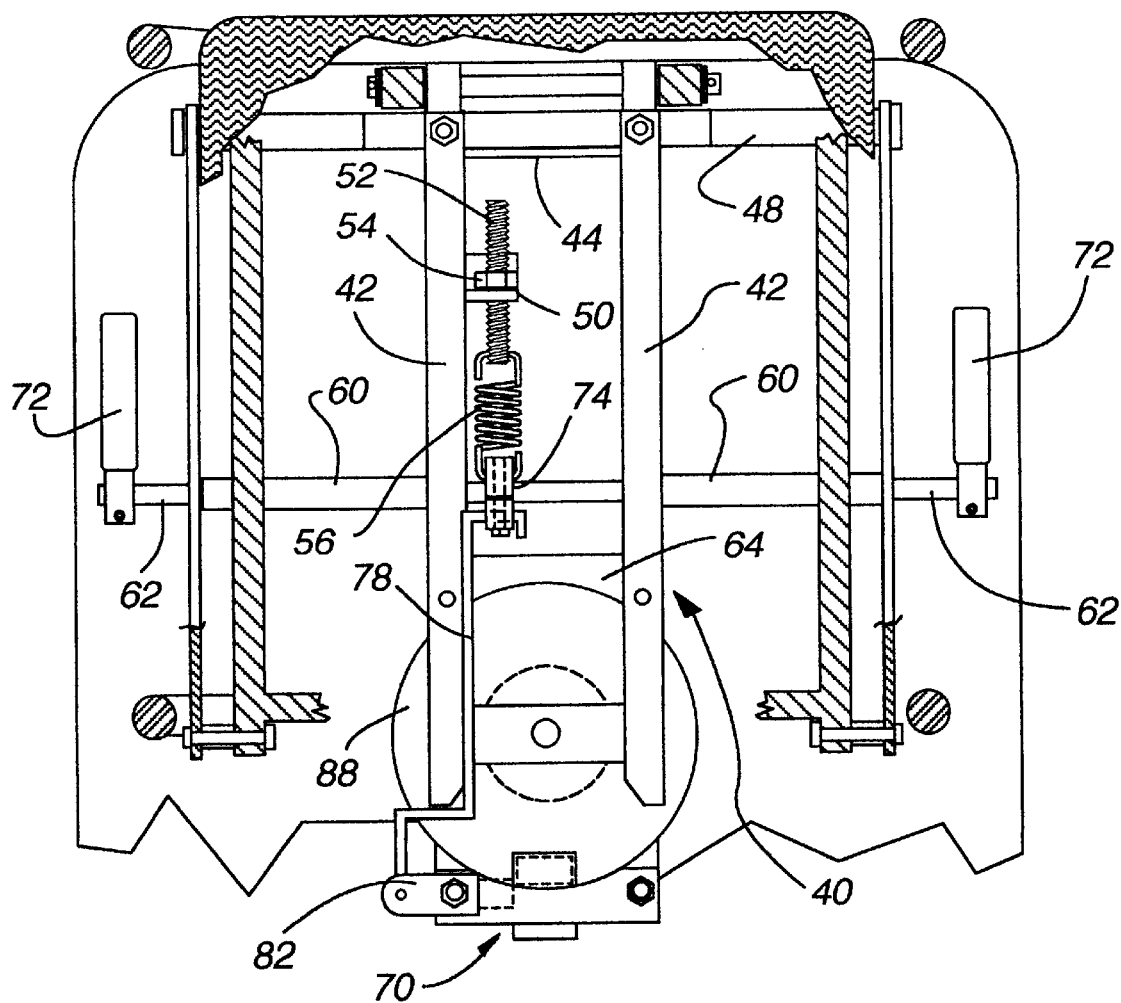
FIG. 7 is a cross sectional view of the seat assembly taken along line 7—7 of FIG. 5.
Figure 8:
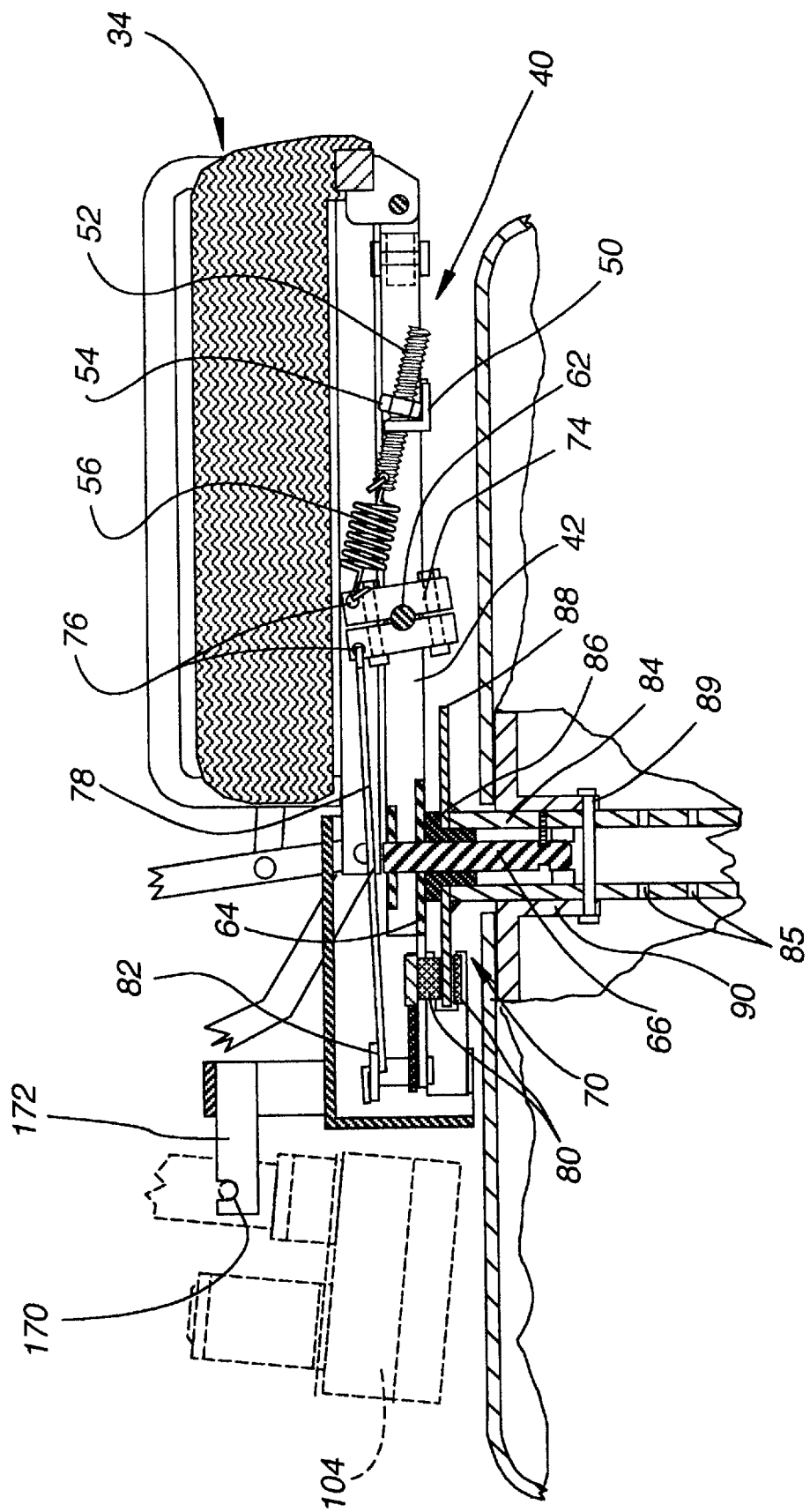
FIG. 8 is a cross sectional view of the seat assembly taken along line 8—8 of FIG. 5.

A personal mobility vehicle 10 in the form of a golf cart is illustrated in FIGS. 1–3. FIG. 4 is a top view of the vehicle sans the seat assembly illustrating various features located beneath the bodywork. The vehicle 10 typically comprises a pair of front wheels 12 and a rear pair of wheels 14, wherein each pair of wheels is connected with the framework 16 (or chassis) of the vehicle through a conventional suspension system (not shown). In the preferred embodiment, a conventional ladder frame chassis is utilized. The front pair of wheels 12 are pivotal relative to the framework 16 and are coupled with a steering tiller 18 through a conventional steering mechanism (not shown). The steering tiller 18 includes a handlebar 20 and a control console 22 with the necessary operational controls to accelerate and decelerate the vehicle. An electrical motor 24 (not shown in detail) including associated gearing is typically coupled with the rear wheels 14. A body 26 and a seat assembly 28 are attached to the framework 16. The seat assembly 28 incorporates a swivel mechanism 30 (as best seen in FIGS. 7 and 8 and as described in a following section) that permits the seat assembly 28 to be rotated up to 360 degrees relative to its axis of attachment to the framework 16. The seat assembly also incorporates a seat tilting mechanism 32 (as best seen in FIGS. 12–16 and described in a following section) that raises and tilts the seat while maintaining the seat back 36 in a generally vertical orientation.

In a preferred embodiment of the vehicle 10, three batteries 38A–C are mounted to the framework 16 proximate the front wheels 12 in a y-shaped configuration, such that one battery 38A is laterally disposed and mounted in front of the axles of the front wheels 12. The other two batteries 38B and C are mounted behind but in close proximity to the front axles in a generally lateral disposition while also extending rearwardly from the longitudinal axis of the vehicle to provide clearance for the front wheels 12. Furthermore, the batteries 38A–C are located relatively low to the ground to help provide the vehicle with a low center of gravity. By locating the relatively heavy batteries (typically deep cycle lead acid batteries) near the front of the vehicle, they act as a counterbalance to the relatively heavy motor 24, the seat assembly 28 and rider, all of which are located near the rear wheels 14 of the vehicle.

Because of the low center of gravity of the vehicle combined with the counterbalancing locations of the batteries 38A–C and a relatively wide track, the vehicle remains stable when the rider swivels the seat assembly 28 to one side and leans in that direction. The vehicle is also stable when the rider faces the seat assembly 28 rearwardly and leans off the back of the vehicle. The vehicle's stability permits the rider to be raised into a pseudo-standing position without the use of support arms or other bracing devices. As described above, support arms or bracing devices are often required in prior art wheelchairs which have tilting seats to prevent the wheelchair from tipping over when the user is in a pseudo-standing position.

U.S. Pat. No. 5,950,751, which is commonly owned with this application, describes a golf cart type personal mobility vehicle incorporating a centralized beam chassis with batteries mounted near the front wheels with a seat assembly and a motor being mounted proximate the rear wheels and is hereby incorporated in its entirety by reference.

The Swivel Mechanism

As mentioned above, the seat assembly 28 can be swiveled up to 360 degrees through a swivel mechanism 30 permitting the rider to place the seat assembly in a variety of positions suitable for performing various tasks including: (1) a forward facing position utilized when driving the vehicle (see FIG. 1); (2) a side facing position which can be utilized when exiting the vehicle or hitting a golf ball (see FIGS. 2 and 3); and (3) a rearwardly facing position (not shown) that can also be used for hitting a golf ball or exiting the vehicle.

Figure 10:
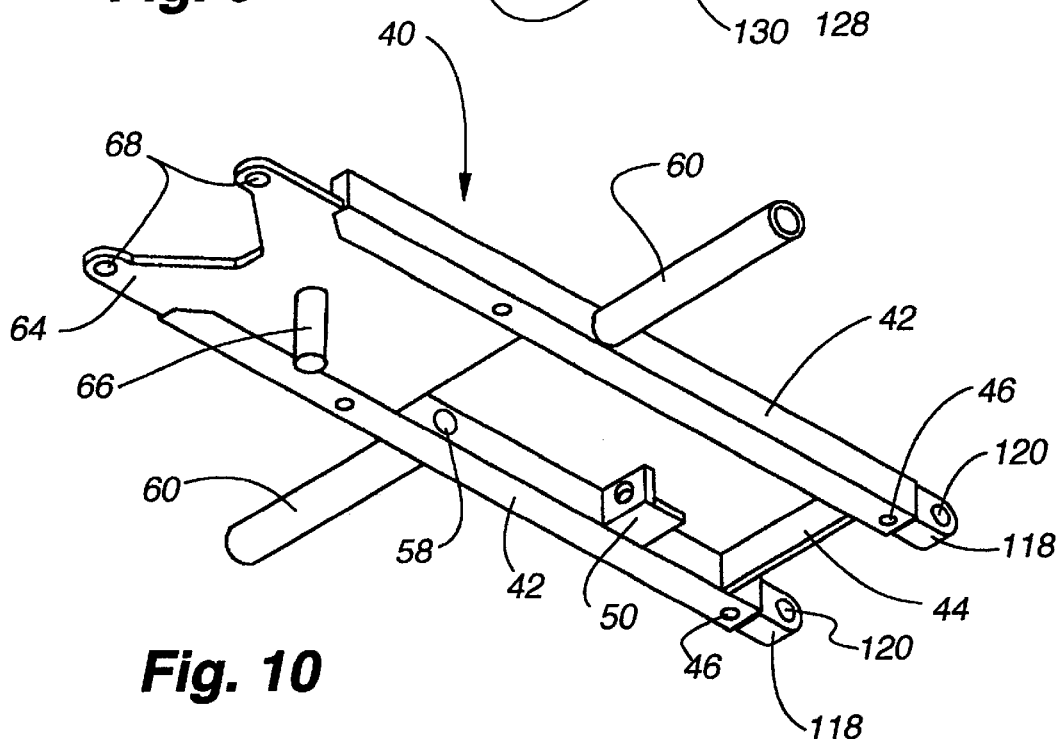
FIG. 10 is an isometric bottom view of the swivel frame of the seat assembly.
Figure 11:
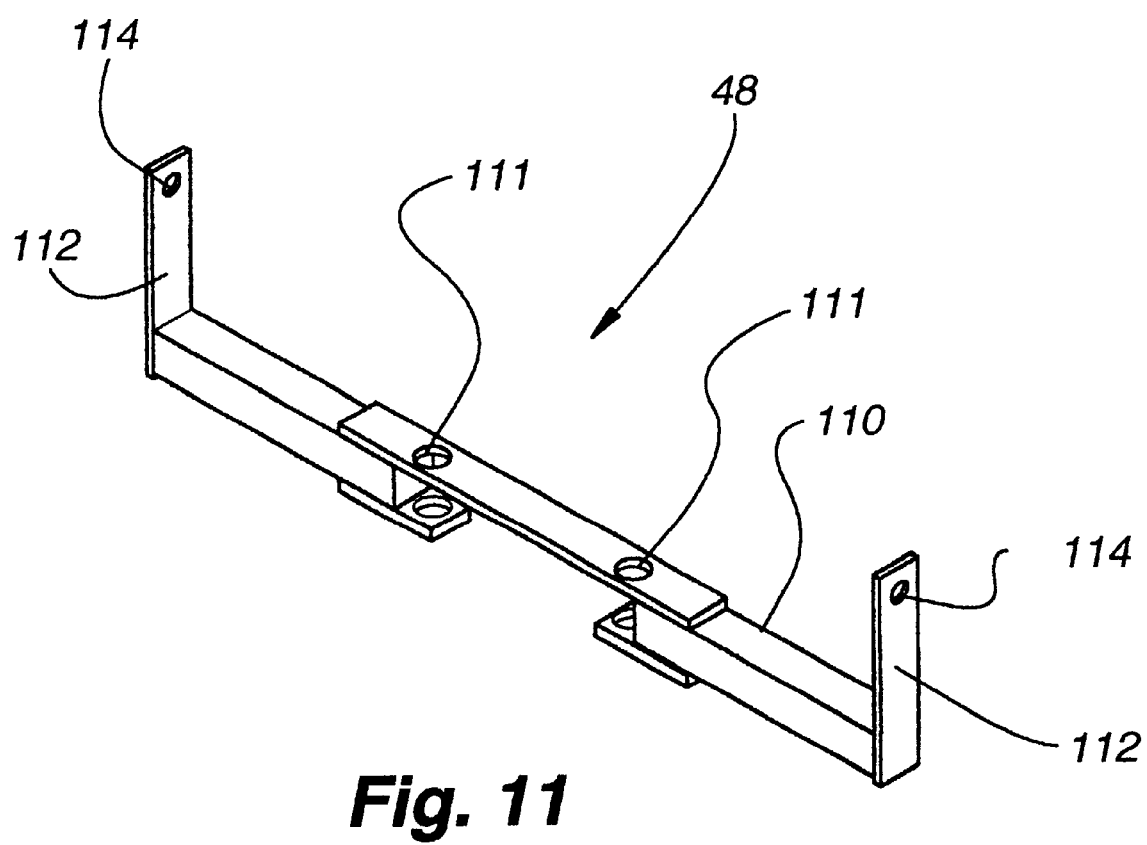
FIG. 11 is an isometric top view of the pivot bracket of the seat assembly.

The exemplary swivel mechanism 30 includes a swivel frame 40, which is illustrated alone in FIG. 10 and is shown in context in FIGS. 7 and 8. The swivel frame 40 comprises two spaced and longitudinally extending tubular cantilever members 42. The cantilever members are joined by cross brace 44 proximate their front ends. The front end of each cantilever member comprises a solid front pivot piece that has a front pivot hole 120 extending through it. The pivot hole 120 is utilized to pivotally couple the swivel frame 40 to support framework 122 of the seat bottom 34 as will be described in greater detail below. Between the front end of each cantilever member 42 and location of the cross brace 44, a vertical bolt hole 46 passes through the cantilever member for receiving a fastener to secure a pivot bracket 48 (shown in FIG. 11) of the seat tilting mechanism 32 to the swivel frame 40 for reasons that will be described in the next section.

Moving rearwardly along the cantilever members 42, a spring retaining bracket 50 is mounted to one of the cantilever members and has a hole passing through it in which threaded adjustment rod 52 is received. One end of the threaded adjustment rod has a nut 54 threaded on to it, wherein the nut is braced against the forwardly facing vertical surface of the spring bracket 50. The other end of the threaded adjustment rod has a hole passing through it, wherein a first hooked end of a coiled extension spring 56 is secured. Approximately midway along the cantilever members 42, a horizontal bore 58 passes through each cantilever member, each bore 58 being aligned with the other. A cylindrical tube 60 extends perpendicularly and laterally from the outside face of each cantilever member and circumscribes the horizontal bore 58. The cylindrical tubes 60 are adapted to receive a brake lever shaft 62.

Proximate the rear end of the cantilever members 42, a brake and swivel pin mounting plate 64 spans the distance between the cantilever members and is affixed thereto. A downwardly extending vertical swivel pin 66 is attached to mounting plate proximate the mounting plate's lateral center axis. Two bolt holes 68 are also provided near the rear of the mounting plate 64 to secure a disk brake caliper 70 to the swivel frame 40.

Figure 5:
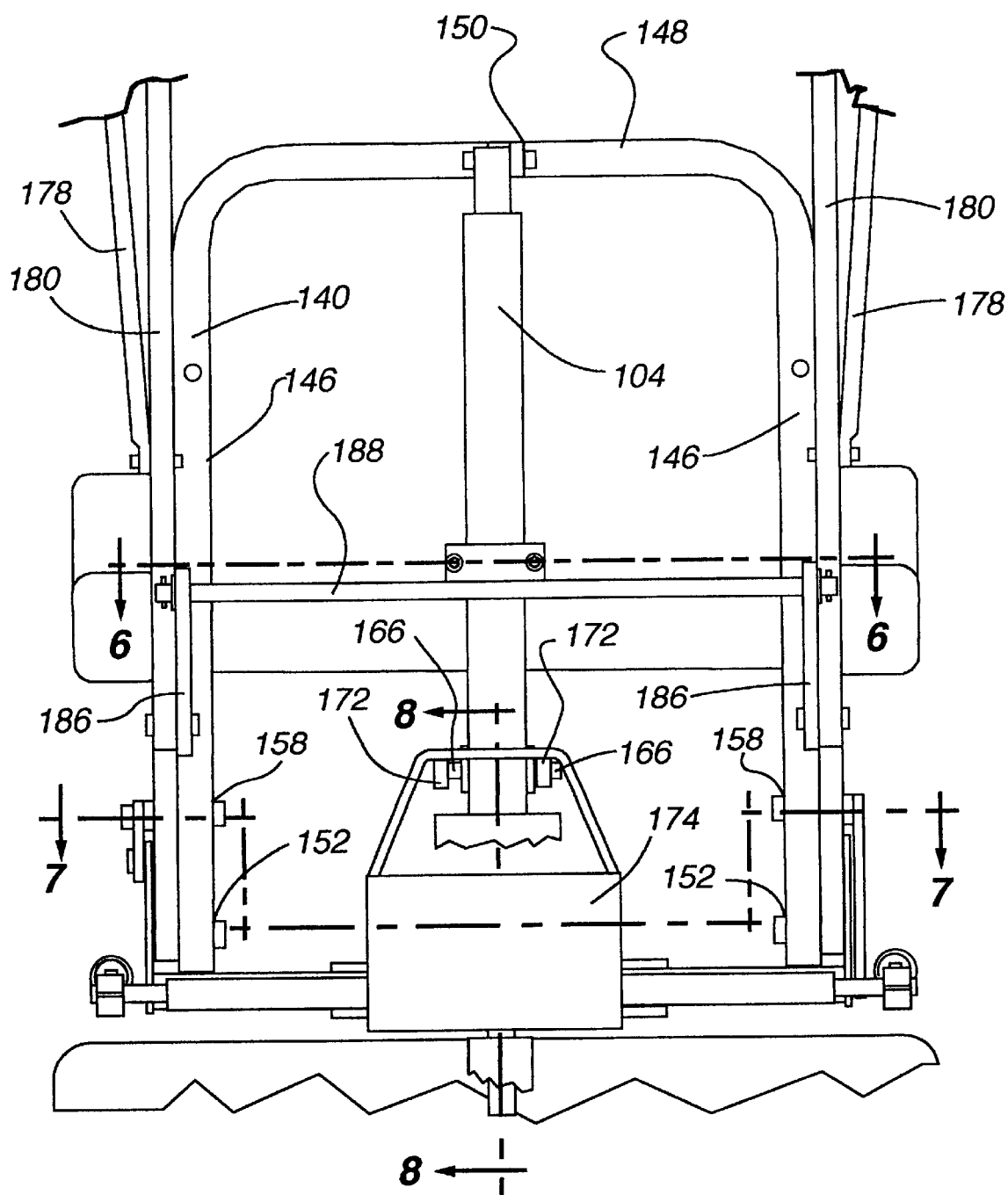
FIG. 5 is a partial rear view of the seat assembly according to one embodiment of the present invention.

The swivel mechanism 30 further comprises a disk brake caliper 70 and associated actuation linkage. The actuation linkage includes the aforementioned brake lever shaft 62, which passes through the cylindrical tubes 60 and is orientated perpendicularly to the cantilever frame members 42. As shown in FIG. 5, the brake lever shaft 62 extends laterally beyond the left and right edges of the seat bottom 34. Handle members 72 are clamped onto the right and left ends of the brake lever shaft 62 and extend longitudinally in a generally horizontal direction perpendicularly to the brake lever shaft. A hand grip comprised of a foam or other resilient material may cover the ends of the handle members 72.

The actuation linkage further comprises a two piece swivel lock block 74 that is clamped to the portion of the brake lever shaft 62 located in between the cantilever members 42 in general longitudinal alignment with the coiled extension spring 56. The swivel lock block also extends vertically a short distance above the brake lever shaft 62, wherein a pair of bores 76 extend laterally through the swivel lock block. One bore has a second hooked end of the extension spring 56 received in it while the other bore has a laterally extending end portion of a generally longitudinally extending caliper actuation rod 78 received in it.

The disk brake caliper 70 is attached to the mounting plate by fasteners received through the bolt holes 68 in the mounting plate 64. The caliper utilized in the preferred embodiment is either a model MB1 caliper manufactured by Tol-o-matic, or a series BA caliper manufactured by Thomas Manufacturing. The mechanical caliper 70 moves one of two opposing pads 80 towards the other when actuated. Specifically, a drive screw (not shown) attached at one end to the backside of one brake pad is driven vertically when the screw is partially rotated. A lever arm 82 is coupled with the drive screw. The rear end of the caliper actuation rod 78 is received in a hole at the distal end of the lever arm 82 as is shown in FIG. 7.

As best shown in FIG. 8, the seat pin 66 is received in a seat post 84 for rotational movement within the seat post. Preferably, the swivel pin 66 is supported by a bearing 86 intervening between the seat post and swivel pin. A brake disk 88 is fixedly mounted to the top of the seat post 84. The brake disk 88 extends outwardly from the seat post 84 with a portion of the disk received in between the opposing pads 80 of the disk brake caliper 70. The seat post 84 has a plurality of vertically aligned apertures 85 extending through the post that correspond to a pair of aligned apertures 89 in a seat mounting sleeve 90 that is connected to the vehicles framework 16. The height of the seat relative to the vehicle may be adjusted by moving the seat post 84 upwardly or downwardly in the seat mounting sleeve 90 to align the desired pair of apertures 85 in the post with the pair of apertures 89 in the mounting sleeve and securing the a shoulder bolt 92 through the aligned apertures.

Figure 12:
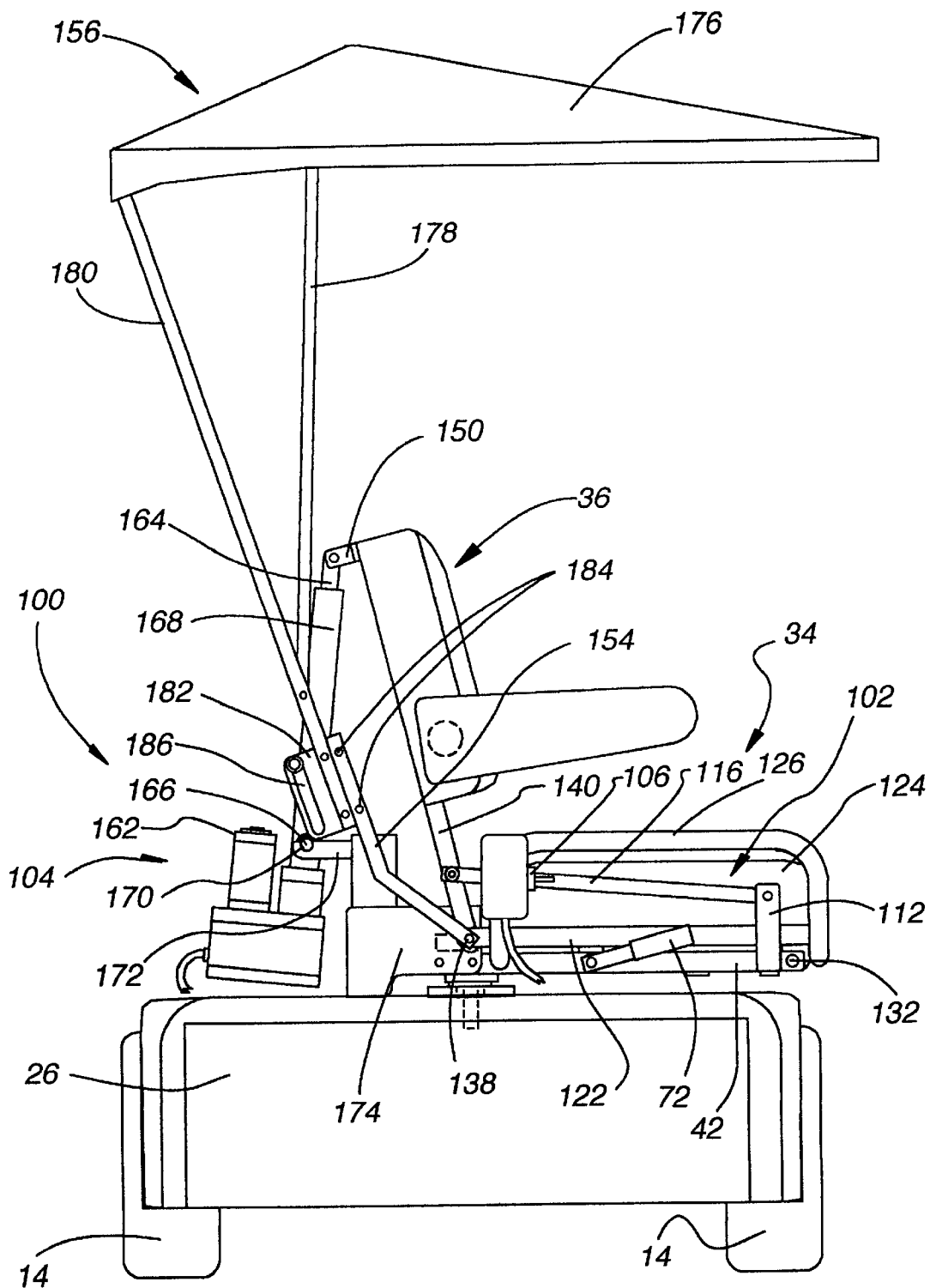
FIG. 12 is a rear view of the personal mobility vehicle with the seat assembly swiveled so that it is facing sideways.

As can be best seen in FIG. 8, the swivel pin 66, which defines the axis of rotation of the seat assembly 28 is preferably located behind the rear edge of the seat bottom 34, such that the swivel frame 40 is essentially a cantilever on which the rest of the seat assembly 28 is supported. This configuration permits the vehicle 10 to have a relatively wide track, since the swiveling portion of the seat assembly 28 is swung outwardly from the longitudinal center of the vehicle as can be seen in FIG. 12. Accordingly, the track of the vehicle 10 is greater than the track of prior art vehicle in which the seat bottom 34 is centered about the swivel axis. Advantageously, the wider track provides a significantly higher degree of vehicle stability than narrow track prior art vehicles, especially when the rider has swiveled the seat assembly to one side and has tilted the seat bottom 34 upwardly.

Operation of the Swivel Mechanism

Nominally, the disk brake caliper 70 is biased in the closed position by the extension spring 56 which acts through the swivel lock block 74 and the caliper actuation rod 78. In the closed position, the opposing brake pads 80 are forced against the brake disk 88 preventing rotational movement of seat frame assembly 28 relative to the fixed brake disk, effectively locking the seat assembly 28 in place.

To swivel the seat assembly 28 about the seat post 84, the rider moves the brake caliper 70 into the open position by pulling upwardly on the handle members 72. This causes (1) the brake lever shaft 62 to rotate clockwise, (2) the brake caliper actuator shaft to be pushed rearwardly, and (3) the brake lever arm 82 to rotate counterclockwise, thereby turning the drive screw and raising the top disk brake pad off of the brake disk. Consequently, the seat assembly 28 is freed for rotational movement at the swivel pin 66. Once the seat assembly 28 has been rotated to the desired position, the handle members 72 are released and the extension spring 56 pulls the brake caliper 70 into its closed position with the brake pads 80 pressed against the disk 88 preventing further pivotal movement of the seat assembly.

The swivel mechanism 30 described above is merely exemplary and numerous variations are contemplated as would be obvious to one of skill in the art with the benefit of this disclosure. For instance, the extension spring could be integrated with the mechanical brake caliper. Furthermore, the mechanical brake caliper could be replaced with a hydraulic brake caliper and a suitable hydraulic actuation mechanism. Additionally, any number of variations relative to the configuration of the seat framework is contemplated that permit the seat to rotate freely.

In other variations of the swivel mechanism, the disk brake may be replaced with any other suitable type of lock mechanism. For example, a motor and drive chain or belt configuration could be utilized, wherein activating the motor causes the seat to rotate and the motor includes a brake mechanism to lock the seat in place when the motor is not activated. In another variation, a ratcheting mechanism could be used to hold the seat in place with a release provided to disengage the ratchet when rotational movement of the seat is desired.

The Seat Tilting Mechanism

Figure 14:
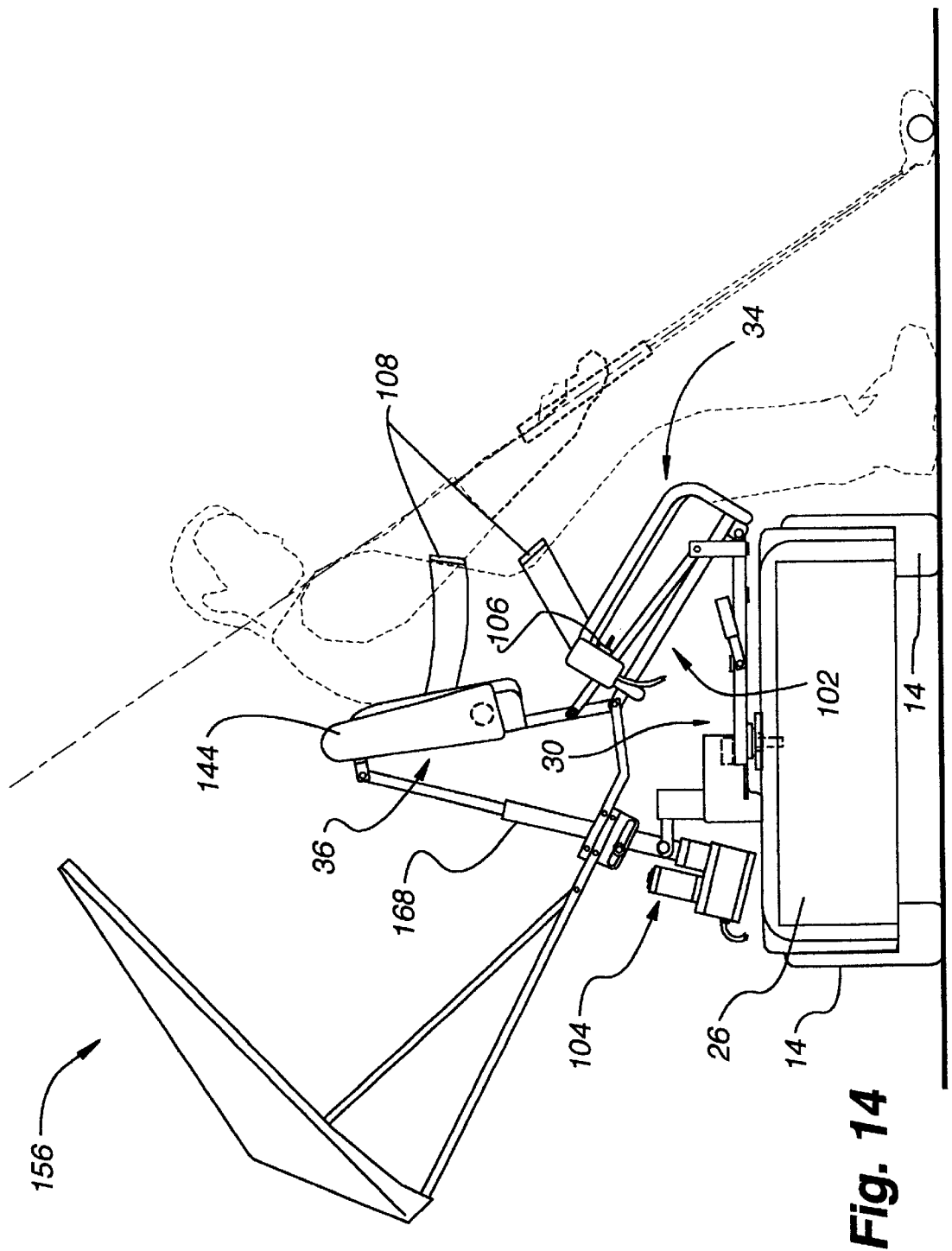
FIG. 14 is a rear view similar to FIG. 13 also showing a rider in the raised and tilted seat in a pseudo-standing position.

As briefly described above, in a preferred embodiment of the invention the seat bottom 34 can be raised at its rear end about a pivot at its front end to move the rider into a pseudo-standing position as is best illustrated in FIGS. 3 and 14. As the seat bottom 34 is raised, the seat back 36 remains at its generally vertical orientation. The seat bottom 34 can be tilted to an infinite number of positions between the upmost pseudo-standing position and the completely retracted substantially horizontal position. In the preferred embodiment the preferred amount of forward tilt of the seat bottom is between 25 degrees and 80 degrees. Tilt angles below 25 degrees are insufficient to put a rider in an upright "standing" stance. With angles in excess of 80 degrees, the seat bottom cannot support the rider as most of the rider's weight is transferred through his legs and feet, which in the case of a paraplegic disabled rider the legs cannot support the weight. The seat back is described herein and in the claims as having a vertical orientation in both the retracted and pseudo-standing (or upright) positions. It is to be understood that concerning the seat back that the use of the term "vertical" is not meant to imply a perfectly vertical orientation, rather the seat back may be canted off of a true vertical position somewhat. Likewise, the seat bottom may be canted at angles slightly off of true horizontal and still fall with the purview of the term "horizontal" as used herein concerning the seat bottom.

The tilting mechanism 32 is comprised of an articulated framework including a four bar linkage 102, pivotally connected seat bottom 34 and seat back 36, an electric linear actuator 104 with an associated control switch 106, and a restraining harness 108 preferably incorporating both seat and chest belts to restrain the rider when in a tilted (or pseudo-standing position). Side views of the tilt seat are provided in FIGS. 12–14 in both the fully retracted and fully tilted positions, as well as a view showing a rider in the seat in the pseudo-standing position. FIG. 5 provides a rear view of the tilt seat.

Figure 13:
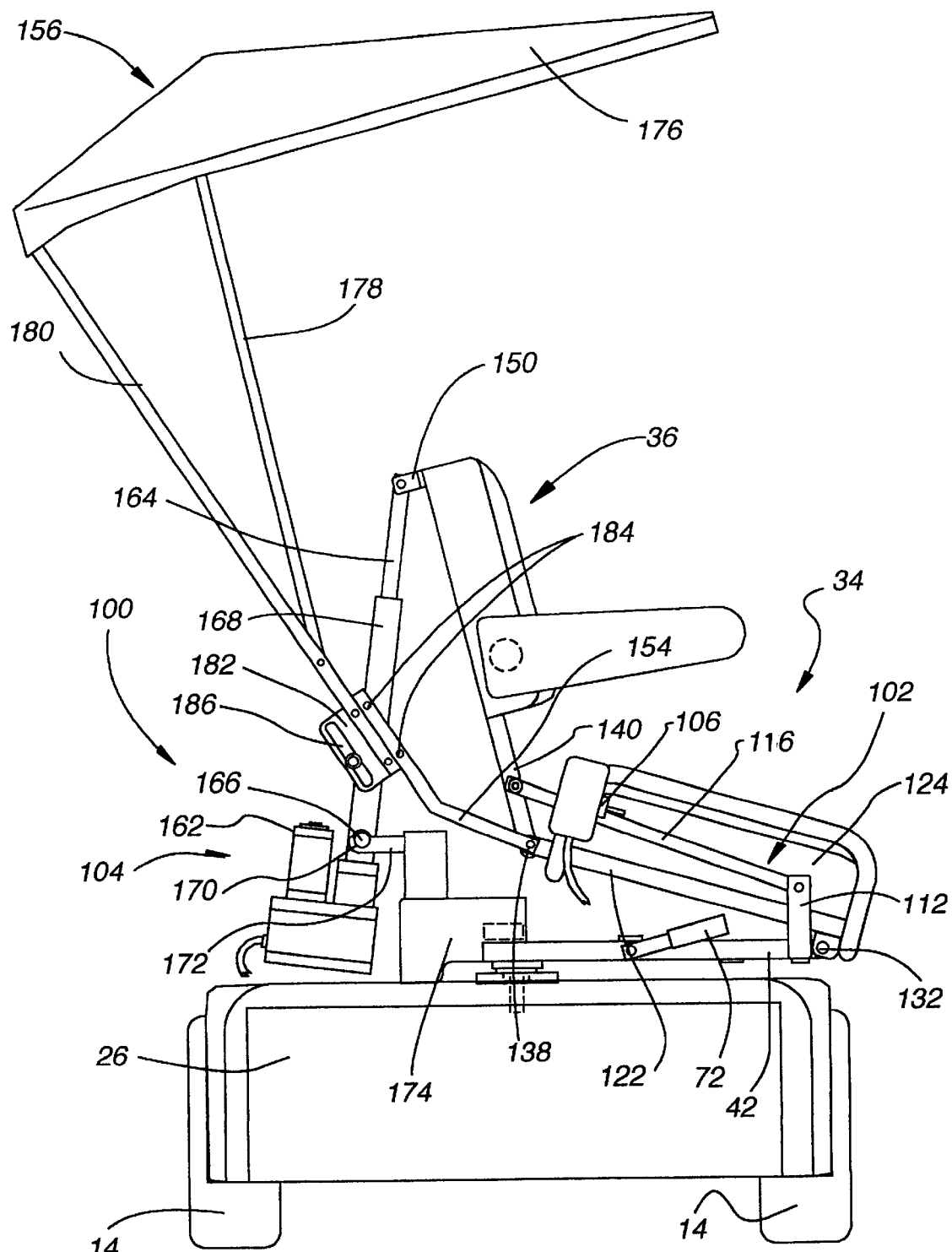
FIG. 13 is a rear view similar to FIG. 12, wherein the seat has been raised and tilted.

Referring to FIGS. 7, 12 and 13, the articulated framework includes a pivot bracket 48 that is laterally centered about and immovably bolted to the longitudinally extending cantilever members 42 of the swivel mechanism's swivel frame 40 through the vertical bores 46 at the front end of the cantilever members and verticals bores 111 through the pivot bracket 48. The pivot bracket is illustrated by itself in FIG. 11. The pivot bracket 48 includes a laterally extending portion 110 that has opposing ends that terminate in two upwardly extending arms 112. Each arm 112 has a laterally extending bore 114 that is aligned with the bore 114 of the other upwardly extending arm 112, wherein the bores are utilized for pivotally connecting a linkage arm 116 of the articulated framework to the pivot bracket 48 as will be described in detail below.

Figure 9:
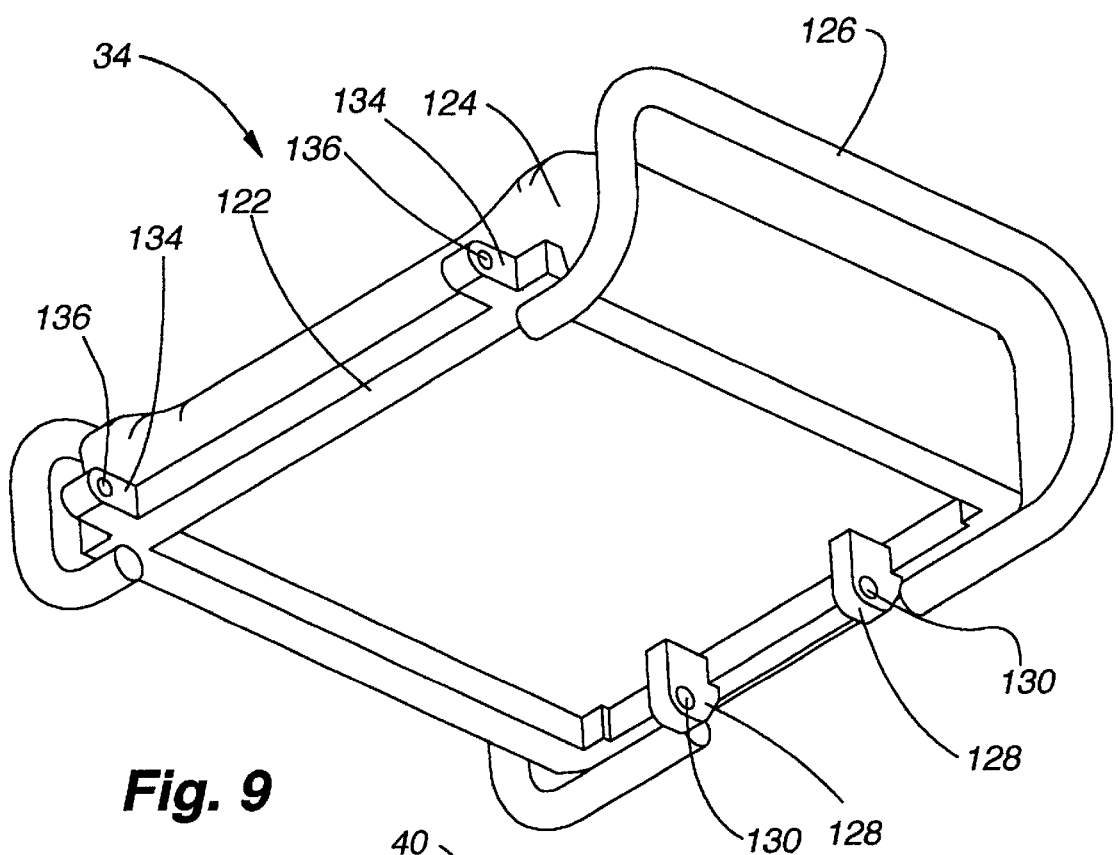
FIG. 9 is an isometric bottom view of the seat bottom of the seat assembly.

Referring to FIG. 9, the seat bottom 34 is typically comprised of the support framework 122 and a cushion 124 on which the rider sits. In the preferred embodiment, a pair of grab rails 126 are also provided along the side of the cushion 124 for use by a disabled rider to situate himself in the seat using his hands and arms. Along the front of each support framework 122, a pair of spaced pivot ears 128 extend downwardly with each pivot ear having a lateral front pivot hole 130 passing through it. The front pivot holes 130 are aligned with the pivot holes 120 of the swivel frame 40. A front pivot bolt 132 is received through each pair of corresponding pivot holes 120 and 130 to pivotally attach the seat bottom 34 to the swivel frame 40 as is best shown in FIG. 12. Accordingly, the seat bottom 34 is disposed for upward rotation in a forward direction about the front pivot bolts 132. The support framework 122 of the seat bottom 34 also has a pair of rearwardly extending arms 134 along the rear edge of the support framework 122, wherein each arm has a lateral rear pivot hole 136 passing through it as best shown in FIG. 9. The rear pivot holes 136 are adapted to receive a rear pivot bolt 138 for pivotally connecting the seat bottom 34 to the seat back 36.

Again referring to FIGS. 12–14, the seat back 36 is typically comprised of a support frame 140 and a cushioned pad 142 that supports the back of the rider. In the preferred embodiment, a pair of adjustable arm rests 144 are provided that can be moved from a generally horizontal first position as shown in FIG. 12 to a generally vertical second position as shown in FIG. 14. The seat back support frame has an inverted "u"-shape with two downwardly extending vertical legs 146 and a horizontal cross section 148 as best seen in FIG. 5. A linear actuator attachment piece 150 extends rearwardly from the cross section 148 and is adapted for pivotal connection to the linear actuator 104. A rear pivot hole 152 is provided at the bottom end of each vertical member 146 for receiving the rear pivot bolt 138 to pivotally join the seat back 36 with the seat bottom 34. Additionally in the preferred embodiment, a canopy pivot arm 154 of a retractable canopy 156 is pivotally attached to the rear pivot bolt 138 as is described in greater detail below. Each vertical member of the seat back support frame 140 also includes a second laterally extending hole 158 that is vertically spaced from the bottom end of the vertical members 146 by several inches. Left and right linkage arms 116 span from the corresponding second hole 158 in a vertical member 146 member to a corresponding bore 114 in one of the upwardly extending arms 112, and are pivotally connected to the seat back support frame 140 and the pivot bracket 48 by corresponding pivot bolts that pass through bolt holes in the linkage arms 116 and the bores and holes in the pivot bracket 48 and seat back support frame 140. The linkage arms 160 act to hold the seat back 36 in its substantially vertical position regardless of the degree of tilt of the seat bottom 34.

Referring to FIGS. 12 and 5, the linear actuator 104 is located behind the seat back 36 and is utilized to lift the seat bottom 34 from a substantially horizontally retracted position to a forwardly tilted extended position that puts the rider in a pseudo-standing stance. The linear actuator 104 illustrated is mechanical using an electric motor 162 to turn gears which act to extend or retract an elongated screw shaft 164. A model 7822851 linear actuator manufactured by Thompson Saginaw is utilized in the preferred embodiment. Other types of linear actuators may be utilized including hydraulic and pneumatic linear actuators as would be obvious to one of ordinary skill in the art and such actuators might be mounted in different locations or orientations from what has been described. In the preferred embodiment, the actuator control switch 106 controls the upward and downward movement of the linear actuator and is attached to the grab bar 126 as shown in FIG. 12. The top end of the elongated screw shaft 164 includes a hole for receiving a pivot bolt which is passed through the corresponding hole in the rear attachment piece 150 to pivotally connect the elongated screw to the seat back 36. A pair of horizontal laterally extending rods 166 are attached to and protrude from a screw housing 168 of the actuator 104. The rods 166 are received in semicircular cutouts 170 in a pair of rearwardly extending arms 172 that are attached to the swivel frame 40 by way of a disk brake cover 174. Accordingly, the linear actuator 104 is pivotally supported and suspended above the body 26 and framework 16 of the vehicle 10 permitting the linear actuator to swivel with the seat assembly 28.

Figure 6:
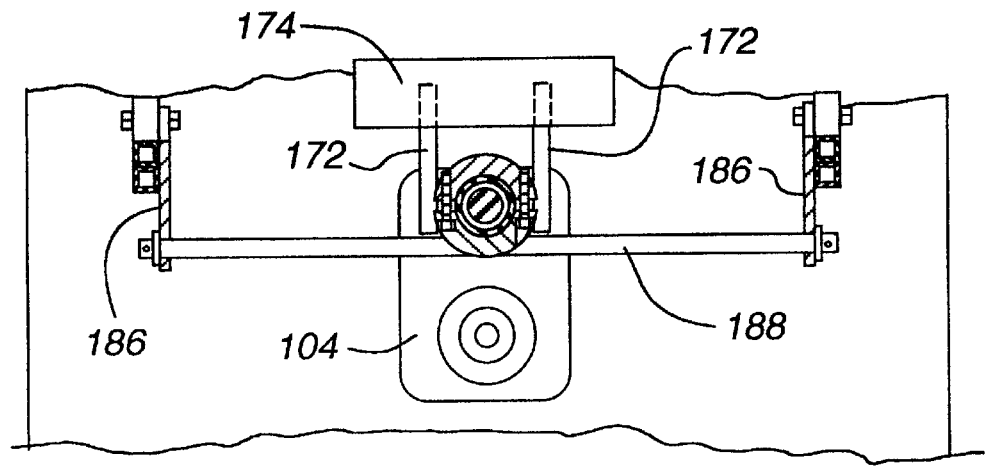
FIG. 6 is a cross sectional view of a portion of the seat assembly taken along line 6—6 of FIG. 5.

As mentioned above, the preferred embodiment incorporates a canopy 156 for shading the rider that retracts when the seat is tilted upwardly to put the rider into the pseudo-standing position. Advantageously, when utilized with a golf cart, the canopy 156 is not in the path of the rider's golf swing. The canopy 156 is comprised of a water resistant or waterproof fabric cover 176 that is supported by a rigid framework (not shown). When the seat is in the retracted position, the canopy 156 is positioned above the rider supported by a pair of shafts 178 and 180 along both the left and right sides of the canopy as can be seen in FIG. 12. The front support shaft 178 meets the rear support shaft 180 and is bolted to the rear support shaft at a location above the rear supports shaft's pivotal attachment to the seat assembly 28. A canopy pivot plate 182 is fixedly attached to each of the rear support shafts 180 proximate their bottom ends. The plate 182 extends longitudinally in front of the rear support shaft, wherein two bolt holes 184 are provided to immovably secure the canopy pivot arm 154 to it. The canopy pivot arm 154 extends between the rear pivot bolt 138 and the pivot plate 182 and is bent at an angle therebetween. The plate 182 also extends longitudinally behind the support 180, wherein an elongated slot 186 extends both rearwardly and vertically and is substantially parallel to the rear support shaft. The left and right ends of a laterally extending circular rod 188 are received in the corresponding slots of the left and right plates 182 for slidable and pivotal movement therein as shown in FIGS. 5 and 6. The circular rod 188 is clamped to the linear actuator proximate its center. In its upright position, the weight of the canopy 156 is supported by both the rear pivot bolt 138 and the circular rod 188 through the linear actuator screw housing 168. Additionally, the canopy is prevented from rotating in a counterclockwise direction by the canopy pivot arm's connection with the rear pivot bolt 138.

Operation of the Tilt Seat

Figure 15:
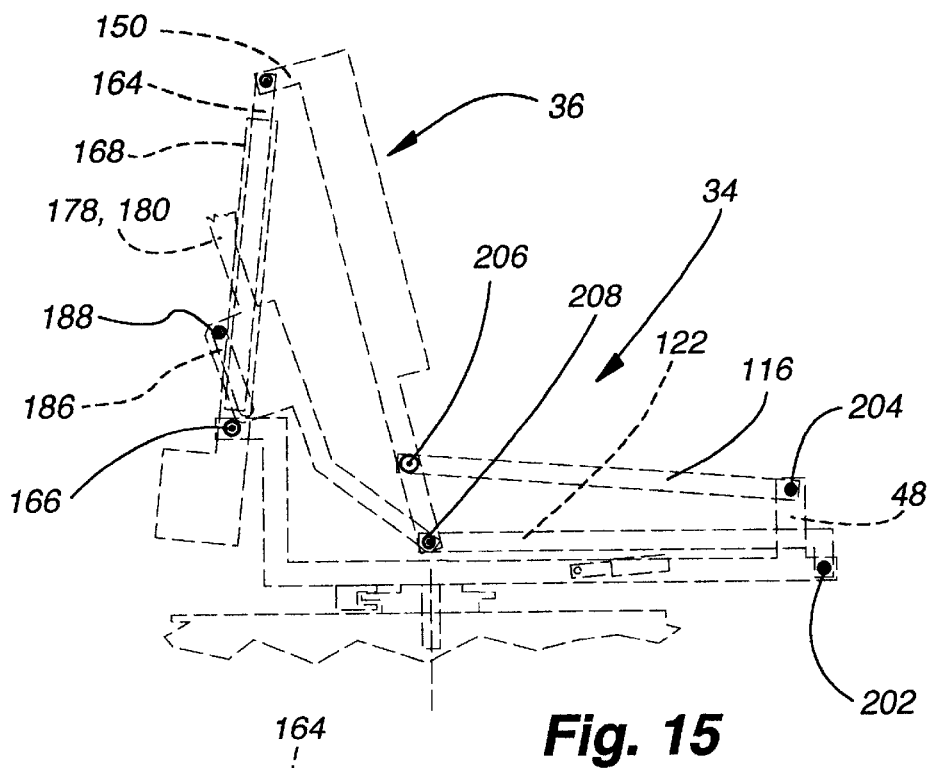
FIG. 15 is a schematic side view of the linkage and pivots of the seat tilting mechanism with the seat in the retracted position.
Figure 16:
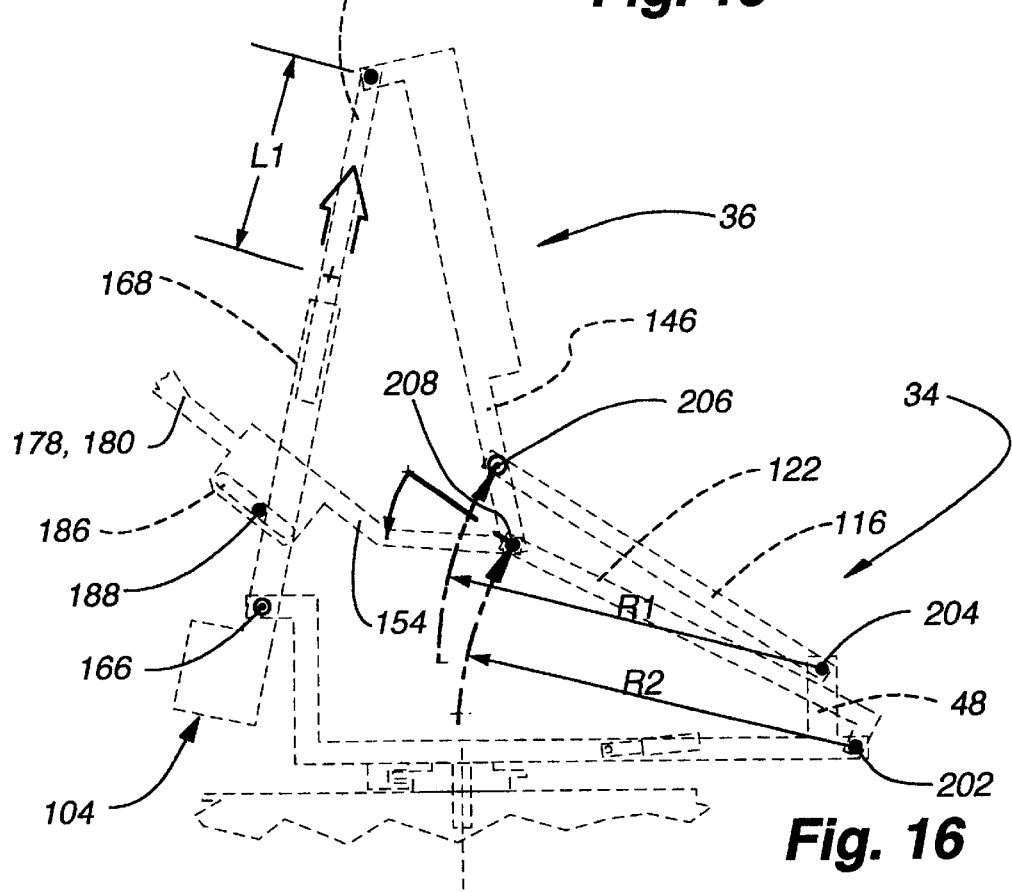
FIG. 16 is a schematic side view similar to FIG. 15, except the seat is shown in a raised and tilted position.

FIGS. 15 and 16 are schematical side views of the tilting mechanism 32 and will be utilized to explain the operation of the tilting mechanism. As can be seen in these figures, the four bar linkage 102 is formed proximate the left and right sides of the seat bottom. The four operative bars for each four bar linkage 102 include: (1) the span between the front pivot 202 and the front linkage pivot 204, which is comprised primarily of the upwardly extending arms 112 of the pivot bracket 48; (2) the span between the front and rear linkage pivots 204 and 206, which comprises the linkage arm 116; (3) The span between the rear linkage pivot 206 and the rear pivot 208, which comprises a partial span of the vertical members 146 of the seat back support frame; and (4) the span between the rear and front pivots 208 and 206, which comprises a portion of the seat bottom support framework 122. It is to be appreciated that the four bar linkage 102 acts to maintain the seat back 36 in its generally vertical orientation as the seat bottom 34 is tilted about the front pivot 202.

To tilt or raise the seat, the user activates the three way toggle control switch 106 by pulling upwardly on it to cause the screw shaft 164 of the actuator 102 to move upwardly. As the screw is extended from the actuator screw housing 168, it pushes the seat back 36 upwardly. Because the actuator screw shaft is disposed at a slight acute angle off of vertical, a longitudinal force is applied to the top of the seat back 36 as the actuator is extended. This longitudinal force would cause the seat back to rotate clockwise about the rear pivot 208 and change its angle relative to horizontal if a four bar linkage 102 or a similar system of articulated linkages were not utilized. It is appreciated that if the seat back did not remain in a generally vertical orientation while the seat bottom is tilted, the change in seat back angle would prevent the rider from using the seat assembly in the desired fashion.

Referring to FIG. 16, as the screw shaft 164 of the actuator 104 is raised, the seat back 36 cannot rotate relative to the rear pivot 208 because the linkage arm 116 connected to the seat back 36 at the rear linkage pivot 206 and the pivot bracket 48 at the front linkage pivot 204 prevents the seat back from rotating about the rear pivot 208. Instead, the seat bottom 34 and seat back 36 are pivoted clockwise about the front pivot 202. As the seat bottom 34 is pivoted about the front pivot 202, the linkage arm 116 also acts to prevent the angle of the seat back 36 from changing relative to horizontal, while the angle between the seat back 36 and the seat bottom 34 increases as the degree of tilt of the seat bottom 34 is increased. Also, as the level of tilt is increased, the seat back 36 moves longitudinally forwardly as well as upwardly as can be seen by comparing FIGS. 15 and 16. This causes the actuator 104 to rotate clockwise in the semicircular cutouts 170 of the rearwardly extending arms 172 of the disk brake cover 174 causing the angle of the screw shaft 164 relative to horizontal to decrease.

As the seat bottom 34 at the rear pivot 208 is raised, the distance between circular rod 188 that is received in the canopy pivot plate's elongated slot 186 and the rear pivot 208 decreases. Furthermore, as the rear pivot is raised the canopy linkage arm 154 is raised as well because of the vertical motion of pivot 208, causing the support shafts 178 and 180 and linkage arm 154 of the canopy assembly 156 to pivot counterclockwise and slide rearwardly along the circular rod 188. Accordingly, the canopy 156 is retracted from above the driver's head.

To lower the raised seat, the rider pushes down on the toggle control switch 106 causing the actuator motor 162 to rotate in reverse and the screw shaft 164 to be lowered. In a manner similar to that described above, the four bar linkage 102 maintains the seat back 36 at a constant angle relative to horizontal as the angle between the seat back 36 and the seat bottom 34 decreases. The canopy linkage arm 154 is pulled downwardly, causing the circular rod 188 to slide upwardly and rearwardly in the plate slot 186 as the rear canopy shaft 180 pivots clockwise into its nominal position over the seat assembly 28.

The seat tilting mechanism 32 described above is merely exemplary and numerous variations are contemplated as would be obvious to one of ordinary skill in the art with the benefit of this disclosure. For instance, any number of different configurations of frame and linkage components are possible to assemble a functioning four bar linkage as described above Furthermore, other types of linkages may be substituted for the four bar linkage that accomplish the same result of maintaining the angle of the seat back relative to horizontal while the seat bottom is tilted forwardly. In other alternative embodiments, means other than linkages, such as separate actuators controlling the seat back and seat bottom individually, can be utilized to maintain the angle of the seat back while the seat bottom is tilted.

Golfing Using the Personal Mobility Vehicle

Figure 17:
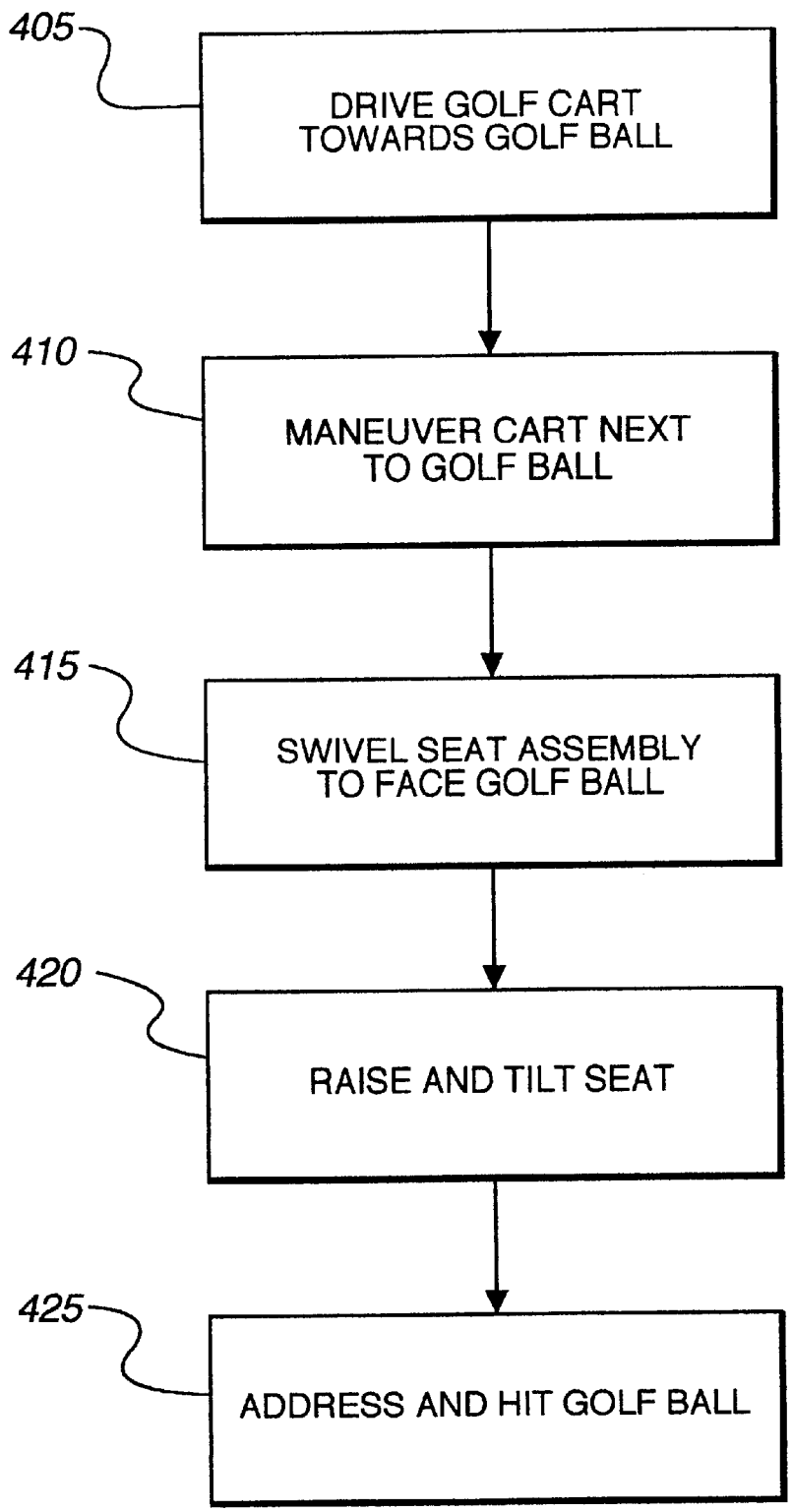
FIG. 17 is a flow chart illustrating a method for playing golf using a personal mobility vehicle of the present invention.

The preferred embodiment of the personal mobility vehicle as illustrated in the accompanying figures is in the form of a golf cart. FIG. 17 is a flow chart describing a method that can be used by a disabled person to play golf. Referring to block 405, a golfer drives the cart to a golf ball that is located on the golf course (assuming the rider had previously hit the ball from the tee box or from another location on the course). As indicated in block 410, the driver situates the cart along one side of the golf ball or so that the ball is just behind the golf cart at a sufficient distance from the cart to permit the rider to dispose himself between the cart and the ball. Next, the golfer lifts up on the brake lever shaft handle member(s) 72 to release the disk brake caliper, and then swivels the seat assembly 28 as necessary so that he is facing the golf ball as indicated in block 415. When he reaches the desired position, the golfer releases the handle member(s) 72 to reapply the brake caliper 70 and lock the seat in place. In block 420, the golfer then activates the control switch to raise and tilt the seat to put himself into a pseudo-standing position as is illustrated in FIG. 14. Finally in block 425, the golfer address the ball with his golf club; swings his club; and hits the ball towards the hole.

Although the present invention has been described with a certain degree of particularity, it is understood that the present disclosure has been made by way of example, and changes in detail or structure not specifically discussed herein may be made without departing from the spirit of the invention as defined in the appended claims.

We claim:

1. A mobility vehicle for movement over a ground surface, the mobility vehicle comprising:
    a vehicle framework for a golf cart, the framework including front, rear, left and right sides;
    a wheeled drive mechanism, the drive mechanism coupled to the vehicle framework; and
    a seat assembly, the seat assembly coupled with the framework for swiveling movement about a swivel axis of rotation to move the seat between a first rotational position facing the front side to at least a second rotational position facing outwardly from one of the left, right and rear sides, the seat assembly including (i) a seat bottom, the seat bottom having a seat bottom support frame and a seating surface disposed on the seat bottom support frame, the seating surface bounded by a front end, a rear end that is longitudinally spaced from the front end, and spaced left and right sides that extend from the front end to the rear end, and, (ii) a seat back, the seat back having a seat back surface; and (iii) a tilting mechanism coupled with the seat bottom and the seat back, the tilting mechanism being configured for moving the seat assembly between a first and second position, the seat bottom being generally horizontal and the seat back being generally vertical in the first position forming a first angle between the seating surface and the seat back surface, and the seat bottom being tilted at least 25 degrees relative to horizontal in the second position forming a second angle between the seating surface and the seat back surface, the second angle being greater than the first angle;
    wherein a user in the seat can (a) swivel the seat from the first rotational position facing towards the front of the vehicle to the second rotational position facing outwardly from at least one of the left, right and rear sides and (2) raise the seat assembly into the second position placing the user into a pseudo-standing position with the user's feet substantially in contact with a ground surface to enable the user to hit a golf ball located on the ground surface with a golf club.

2. The mobility vehicle of claim 1, further comprising a restraining mechanism to releaseably secure the seat assembly in at least one of the first and second rotational positions.

3. The mobility vehicle of claim 2, wherein the restraining mechanism comprises a disk brake caliper and a brake disk, wherein one of the brake caliper and the disk is fixedly coupled with the framework and the other of the brake caliper and the disk is attached to the seat assembly.

4. The mobility vehicle of claim 1, wherein the swivel axis of rotation is located longitudinally behind the rear end of the seat bottom.

5. The vehicle of claim 1, wherein the swivel axis of rotation is located proximate the rear end of the seat bottom.

6. The mobility vehicle of claim 1, further comprising a canopy, the canopy being substantially over the seat bottom in the first position and substantially behind the seat bottom in the second position.

7. The mobility vehicle of claim 1, wherein the back end of the seat bottom and the seat back are raised vertically in the second position relative to the first position.

8. The mobility vehicle of claim 1, further comprising a golf bag holder.

9. The mobility vehicle of claim 1, wherein the seat assembly can swivel 360 degrees.

10. The mobility vehicle of claim 1, wherein the tilt mechanism further comprises a linear actuator, one end of the linear actuator being attached to the seat back.

11. The mobility vehicle of claim 10, wherein the linear actuator is pivotally attached to the seat back proximate a top edge of the seat back.

12. The mobility vehicle of claim 1, wherein the tilting mechanism comprises a four bar linkage.

13. The mobility vehicle of claim 1, wherein the drive mechanism further comprises an electric motor, associated batteries and front and rear wheels, the electric motor and seat assembly being attached to the framework proximate the rear wheels, and the batteries being located on the framework proximate the front wheels.

14. The mobility vehicle of claim 1, wherein the tilting mechanism further comprises a linkage including a plurality of pivotally-connected bars with a substantial majority of at least one bar of the plurality of pivotally-connected bars positioned above the seat bottom support frame when the tilting mechanism is in the first position.

15. The mobility vehicle of claim 1, wherein the seat bottom is located between a rear pair of wheels of the wheeled drive mechanism.

16. The mobility vehicle of claim 1, wherein the swivel axis is located proximately above an axis of rotation of a rear pair of wheels of the wheeled drive mechanism.

17. A seat assembly for use on a personal mobility vehicle, the seat assembly comprising:
a seat bottom, the seat bottom having a front edge, a rear edge and a seat surface;
a seat back, the seat back having a bottom, a top edge and a seat back surface;
a swivel mechanism, the swivel mechanism comprising a mounting portion adapted for coupling with the personal mobility vehicle, and a swiveling portion permitting swivel movement of the seat back and seat bottom in a generally horizontal plane relative to the mounting portion; and
a tilting mechanism coupled to the seat back, the seat bottom and the swivel portion of the swivel mechanism, the tilting mechanism being configured for moving the seat bottom between a first and second positions, the seat bottom being generally horizontal and the seat back being generally vertical in the first position forming a first angle between the seating surface and the seat back surface, and the seat bottom being tilted at relative to horizontal in the second position forming a second angle between the seating surface and the seat back surface, the second angle being greater than the first angle;
wherein the tilt mechanism further includes a linear actuator, the linear actuator being pivotally connected to the seat back.

18. the seat assembly of claim 17, wherein the swivel mechanism further comprising a restraining mechanism to releaseably secure the swiveling portion relative to the mounting portion in one or more swivel positions.

19. The seat assembly of claim 18, wherein the restraining mechanism comprises (i) a brake pad attached to one of the mounting portion and the swiveling portion, and (2) a braking surface attached to the other of the mounting portion and the swiveling portion, wherein the brake pad is biased against the braking surface to secure the swiveling portion.

20. The seat assembly of claim 17, wherein the tilting mechanism is pivotally coupled to the swiveling portion of the swivel mechanism along a pivot axis proximate the front edge of the seat movement between the first and second positions.

21. The seat assembly of claim 20, wherein the seat bottom is pivotally coupled to the seat first location proximate the rear edge of the seat bottom.

22. The seat assembly of claim 21, wherein the tilt mechanism further comprises a linkage arm, the linkage arm being pivotally coupled (i) at a rear end to the seat back at a second location vertically disposed from the first location and (ii) at a front end to the swiveling portion of the swivel mechanism at a third location vertically disposed from the pivot axis.

23. The seat assembly of claim 22, wherein the linear actuator is also pivotally connected with the swiveling portion of the swivel mechanism.

24. The seat assembly of claim 20, wherein the tilt mechanism causes the rear edge of the seat bottom and the seat back to be raised relative to the front edge when the seat bottom is moved the first position to the second position.

25. A mobility vehicle for movement over a ground surface, the mobility vehicle comprising:
a chassis;
a wheeled drive mechanism, the drive mechanism coupled to the chassis; and
a seat assembly coupled with the chassis, the seat assembly including (i) a seat back, (ii) a seat bottom, (iii) a seat base framework, and (iv) an articulated four bar linkage connecting the seat base framework, the seat back and the seat bottom and configured for moving the seat bottom from a fully retracted position, wherein the seat bottom is substantially horizontal, to a fully tilted position, wherein the seat bottom forms an angle with a horizontal plane, while maintaining the seat back at a relatively constant angle relative to the horizontal plane, and (iv) a linear actuator, the linear actuator pivotally connected to the seat back at one end for moving the seat between a fully retracted position and a fully tilted position.

26. The mobility vehicle of claim 25, further comprising a canopy, the canopy being pivotally coupled with the seat assembly, wherein the seat assembly is substantially covered by the canopy in the fully retracted position, and the seat assembly is substantially not covered by the canopy in the fully tilted position.

27. The mobility vehicle of claim 26, wherein the canopy comprises at least one support arm, the at least one support arm being pivotally coupled to the seat assembly.

28. The mobility vehicle of claim 25, wherein the four bar linkage comprises (i) the seat bottom between a front edge and a rear edge of the seat bottom, (ii) a generally vertical portion of the seat back between a bottom end of the seat back to an intermediate location in-between the bottom end and a top end of the seat back, the generally vertical portion of the seat back being connected with the rear edge of the seat bottom at a first pivot joint, (iii) a generally horizontally orientated linkage bar connected with the generally vertical portion of the seat back at the intermediate location by a second pivot joint at a rear end, and (iv) a generally vertically disposed member extending between a third pivot joint connected with the linkage bar at a top end and a forth pivot joint connected with the front edge of the seat bottom at a bottom end, the bottom end also being fixedly connected with the base frame.

29. The mobility vehicle of claim 25, wherein the seat base framework is integral with the chassis.

30. The mobility vehicle of claim 25, wherein the seat base framework is pivotally connected to the chassis for swivel movement about a substantially vertical axis.

31. The mobility vehicle of claim 25, wherein the linear actuator is also pivotally coupled with the seat base framework.

32. A mobility vehicle for movement over a ground surface, the mobility vehicle comprising:
a chassis;
a wheeled drive mechanism, the wheeled drive mechanism being coupled to the chassis;
a seat assembly coupled to the chassis, the seat assembly including a seat bottom that is moveable between a fully retracted position, wherein the seat bottom is horizontal, to a fully tilted position, wherein the seat bottom forms an angle with a horizontal plane; and a retractable canopy assembly including a canopy, the canopy assembly being pivotally coupled with the seat assembly, wherein the seat assembly is substantially covered by the canopy in the fully retracted position, and the seat assembly is substantially not covered by the canopy in the fully tilted position.

33. The mobility vehicle of claim 32, wherein the canopy is located behind the seat assembly when the seat bottom is in the fully tilted position.

34. The mobility vehicle of claim 32, wherein the seat bottom is tilted to an angle of at least 25 degrees relative to a horizontal plane in the fully tilted position.

35. The mobility vehicle of claim 34, wherein the seat further includes a seat back, the seat back being substantially vertical in both the fully tilted and fully retracted positions, the seat back also being vertically disposed in the fully tilted position relative to the fully retracted position.

36. The mobility vehicle of claim 32, wherein the seat is pivotally connected to the chassis for swivel movement about a substantially vertical axis relative to the chassis.

37. A personal mobility vehicle comprising:
a chassis;
a wheeled drive mechanism; and
a seat assembly including (i) a swivel frame, the swivel frame being coupled to the chassis for swivel movement around a substantially vertical swivel axis, (ii) a seat bottom having front and rear edges, the seat bottom being pivotally attached to the swivel frame along a substantially horizontal pivot axis proximate the front edge, the seat bottom being tiltable about the horizontal pivot axis by raising the rear edge of the seat bottom from a horizontal orientation to a second orientation forming an angle with a horizontal plane, (iii) a seat back that is pivotally connected with the rear edge of the seat bottom, wherein the seat back is raised with the rear edge of the seat bottom, while maintaining a generally vertical orientation; and (iv) a linear actuator, the linear actuator being pivotally attached to the seat back and coupled with the swivel frame, wherein actuation of the linear actuator raises the seat back and the pivotally connected seat bottom rear edge upwardly.

38. The mobility vehicle of claim 37, wherein the angle is equal to or greater than 25 degrees.

39. The mobility vehicle of claim 33, wherein the seat is pivotally connected to the chassis for swivel movement about a substantially.

40. The mobility vehicle of claim 37, wherein the seat back, seat bottom and the swivel frame are interconnected by a plurality of pivot joints to form a four bar linkage.

41. A seat assembly for use on a personal mobility vehicle, the seat assembly comprising:
a seat bottom, the seat bottom having a front edge and a rear edge;
a seat back, the seat back having a bottom and a top edge;
a swivel mechanism, the swivel mechanism comprising a mounting portion adapted for coupling with the personal mobility vehicle, and a swiveling portion permitting swivel movement of the seat back and seat bottom in a generally horizontal plane relative to the mounting portion; and
a tilting mechanism coupled to the seat back, the seat bottom and the swivel portion of the swivel mechanism, the tilting mechanism being configured for moving the seat bottom between a first and second positions, the seat bottom being generally horizontal in the first position, and being tilted at an angle relative to horizontal in the second position, the seat back having a similar angular orientation relative to horizontal in both the first and second positions;
wherein the tilting mechanism is pivotally coupled to the swiveling portion of the swivel mechanism along a pivot axis proximate the front edge of the seat bottom for pivotal movement between the first and second positions.

42. The seat assembly of claim 41, wherein the tilting mechanism further comprises a linkage including a plurality of pivotally-connected bars with a substantial majority of at least one bar of the plurality of pivotally-connected bars positioned above a bottom surface of the seat bottom support frame when the tilting mechanism is in the first position.

43. The seat assembly of claim 41, wherein the tilt mechanism further includes a linear or, the linear actuator being pivotally connected to the seat back.

44. The seat assembly of claim 43, wherein the linear actuator is also pivotally connected with the swiveling portion of the swivel mechanism.

45. A mobility vehicle for movement over a ground surface, the mobility vehicle comprising:
a chassis;
a wheeled drive mechanism, the wheeled drive mechanism being coupled to the chassis;
a seat assembly with a seat bottom coupled to the chassis; and
a retractable awning, the retractable awning movable between a covered position with the awning substantially disposed over the seat to an uncovered position with the awning substantially not disposed over the seat, wherein the awning is in the covered position when the seat bottom is in a first position, and the awning is in the uncovered position when the seat bottom is in a second position and wherein the awning further comprises one or more support shafts that are pivotally connected to the seat to facilitate automatic retraction of canopy as the seat bottom is moved from the first to second posies.

46. The mobility vehicle of claim 45, wherein the seat is coupled to the chassis to permit swiveling movement of the seat assembly relative to the chassis.

* * * * *